United States Patent
Duquesne et al.

(10) Patent No.: US 10,820,506 B2
(45) Date of Patent: *Nov. 3, 2020

(54) CONTROL METHOD AND APPARATUS FOR A ROTOR CAGE WITH ACTUATED CAGE VANES IN A HARVESTER

(71) Applicant: CNH Industrial America LLC, New Holland, PA (US)

(72) Inventors: Frank R. G. Duquesne, Zwevegem (BE); Jonathan E. Ricketts, Coal Valley, IL (US); Herbert M. Farley, Elizabethtown, PA (US); Wayne T. Flickinger, Oxford, PA (US); Brecht Vanmullem, Koekelare (BE); Arno Leenknegt, Hooglede (BE); Dré Waltherus Joachim Jongmans, Klundert (NL); Glenn Aesaert, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/057,938

(22) Filed: Aug. 8, 2018

(65) Prior Publication Data

US 2018/0343798 A1    Dec. 6, 2018

Related U.S. Application Data

(63) Continuation of application No. 15/041,679, filed on Feb. 11, 2016, now Pat. No. 10,064,333.

(51) Int. Cl.
*A01D 41/127*     (2006.01)
*A01F 7/06*       (2006.01)

(52) U.S. Cl.
CPC ..... *A01D 41/1273* (2013.01); *A01D 41/1274* (2013.01); *A01F 7/062* (2013.01); *A01F 7/067* (2013.01)

(58) Field of Classification Search
CPC . A01D 41/1273; A01D 41/1274; A01F 7/062; A01F 7/067; A01F 12/28
USPC .......................... 460/4, 62, 84, 69, 108, 109
See application file for complete search history.

(56) References Cited

U.S. PATENT DOCUMENTS

| | | |
|---|---|---|
| 4,244,380 A | 1/1981 | DePauw et al. |
| RE31,257 E | 5/1983 | Glaser et al. |
| 4,934,985 A | 6/1990 | Strubbe |
| 6,442,916 B1 | 9/2002 | Pope |
| 6,591,145 B1 | 7/2003 | Hoskinson et al. |
| 6,592,453 B2 | 7/2003 | Coers et al. |
| 7,473,170 B2 | 1/2009 | McKee et al. |
| 8,118,649 B1 | 2/2012 | Murray et al. |
| 8,231,446 B2 | 7/2012 | Pope et al. |
| 8,469,784 B1 | 6/2013 | Hoskinson et al. |

(Continued)

FOREIGN PATENT DOCUMENTS

GB        1534314        11/1978

*Primary Examiner* — Robert E Pezzuto
(74) *Attorney, Agent, or Firm* — Patrick Sheldrake; Peter Zacharias

(57) ABSTRACT

A method for controlling crop material speed through a rotor/cage assembly of an agricultural combine. The method includes the steps of monitoring a grain loss of the combine and adjusting an orientation of a vane coupled to the cage responsive to the grain loss, a cleaning system load and/or a straw length.

14 Claims, 6 Drawing Sheets

(56) References Cited

U.S. PATENT DOCUMENTS

| | | |
|---|---|---|
| 8,968,064 B2 | 3/2015 | Kile |
| 9,282,696 B2 * | 3/2016 | Regier .................... A01F 12/28 |
| 9,788,491 B2 | 10/2017 | Duquesne et al. |
| 2009/0111547 A1 * | 4/2009 | Pope ....................... A01F 7/067 |
| | | 460/80 |
| 2011/0320087 A1 | 12/2011 | Farley et al. |

* cited by examiner

CONTROL METHOD AND APPARATUS FOR A ROTOR CAGE WITH ACTUATED CAGE VANES IN A HARVESTER

CROSS REFERENCE TO RELATED APPLICATIONS

This is a continuation of U.S. patent application Ser. No. 15/041,679, entitled "CONTROL METHOD AND APPARATUS FOR A ROTOR CAGE WITH ACTUATED CAGE VANES IN A HARVESTER", filed Feb. 11, 2016, which is incorporated herein by reference.

BACKGROUND OF THE INVENTION

1. Field of the Invention

The present invention relates generally to an adjustable threshing cage vane for the threshing system of an agricultural combine, and more particularly, to a system and method for remote control of an adjustable threshing cage vane, e.g., the pitch angle thereof, including while the threshing system is operating, for improving threshing performance and other operating parameters.

2. Description of the Related Art

It is known to utilize a plurality of vanes on the inner surface of a threshing rotor cage or casing to assist in guiding or directing the movement of the crop material through the threshing system of a combine. It is further known that such vanes can be manually moved and secured in several positions or orientations, namely, pitch angles, for a variety of reasons, including for different crop types or conditions. In a basic form the vanes are be bolted on the cage or casing at several different pitch angles relative to the axis rotation of a rotor of the system. In a more complex form, it is known to link multiple vanes for joint adjustment. Reference in this regard, DePauw et al., U.S. Pat. No. 4,244,380 issued Jan. 13, 1981 to International Harvester Co; and more recently, McKee et al., U.S. Pat. No. 7,473,170, issued Jan. 6, 2009 to CNH America LLC, the latter of which patents discloses visual indicia of vane position.

While manual setting of threshing cage vane position has utility, it suffers from shortcomings including inability to adjust during operation of the threshing system, particularly in real time, responsive to changing conditions, for instance, responsive to changing conditions such as varying crop conditions within a field, e.g., population/yield, moisture content; atmospheric conditions, e.g., humidity; ground speed; grain loss; and the like, and changes in other operating parameters or settings made in process, such as, but not limited to: threshing rotor speed; concave gap; power consumption, and the like. In this regard, threshing rotor speed and the concave gap (distance between a perforated concave region of the threshing cage or casing and the rotating rotor contained therein) are sometimes varied in process while harvesting for improving productivity, throughput and other conditions, but must be balanced with other factors such as possible grain cracking or other damage, and grain loss.

As a practical illustration of the possible impact of the above shortcomings, before and/or during a harvesting operation, a combine operator will set the rotor speed, that is, the rotational speed of the rotor or rotors within the threshing cage, and/or the concave gap. Settings for these parameters will be selected for various reasons, including, but not limited to, to accommodate or adjust for variations in crop moisture content and humidity, which can change over the course of a day, and between different crop varieties and regions of a field. Grain cracking and other damage can occur as a result of over aggressive threshing, which can result from high rotor speed and/or an undersized concave gap size. Higher than desired grain loss can result from settings of other systems of the combine, e.g., the grain cleaning system, and also from the threshing cage vane setting. In this latter regard, a steeper or more vertical vane pitch angle setting will typically result in the crop material flowing in a correspondingly steeper or tighter helical path through that region of the threshing cage, and thus greater dwell time in the threshing system for threshing and separating; while a less steep or more horizontal vane pitch angle will result in crop material flow at a less steep or looser helix and less dwell time, threshing and separating, which can result in increased grain loss.

Thus, what is sought is a manner of threshing cage vane position setting that provides the ability for real time adjustment while harvesting and optimization, while avoiding one or more of the shortcomings set forth above.

SUMMARY OF THE INVENTION

The present invention provides an inventive control system and method of adjusting the positions of threshing cage vanes.

The invention in one form is directed to a method for controlling crop material speed through a rotor/cage assembly of an agricultural combine. The method includes the steps of monitoring a grain loss of the combine; computing an engine power reserve value; and adjusting an orientation of a vane coupled to the cage responsive to the engine power reserve value and to the grain loss, a cleaning system load and/or a straw length.

The invention in another form is directed to an agricultural combine including a chassis, at least one cage carried by the chassis, a rotor, a plurality of vanes and a controller. The rotor is configured to rotate about an axis within the cage, with the rotor and cage together being a rotor/cage assembly. The vanes are movably coupled to an inside surface of the cage. The controller is configured to control crop material speed through the rotor/cage assembly by carrying out the steps of monitoring a grain loss of the combine; computing an engine power reserve value; and adjusting an orientation of the vanes responsive to the engine power reserve value and to the grain loss, a cleaning system load and/or a straw length.

An advantage of the present invention is that the grain loss and engine power consumption are co-managed.

Another advantage is that the present invention reduces overall grain loss of the combine as conditions change.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
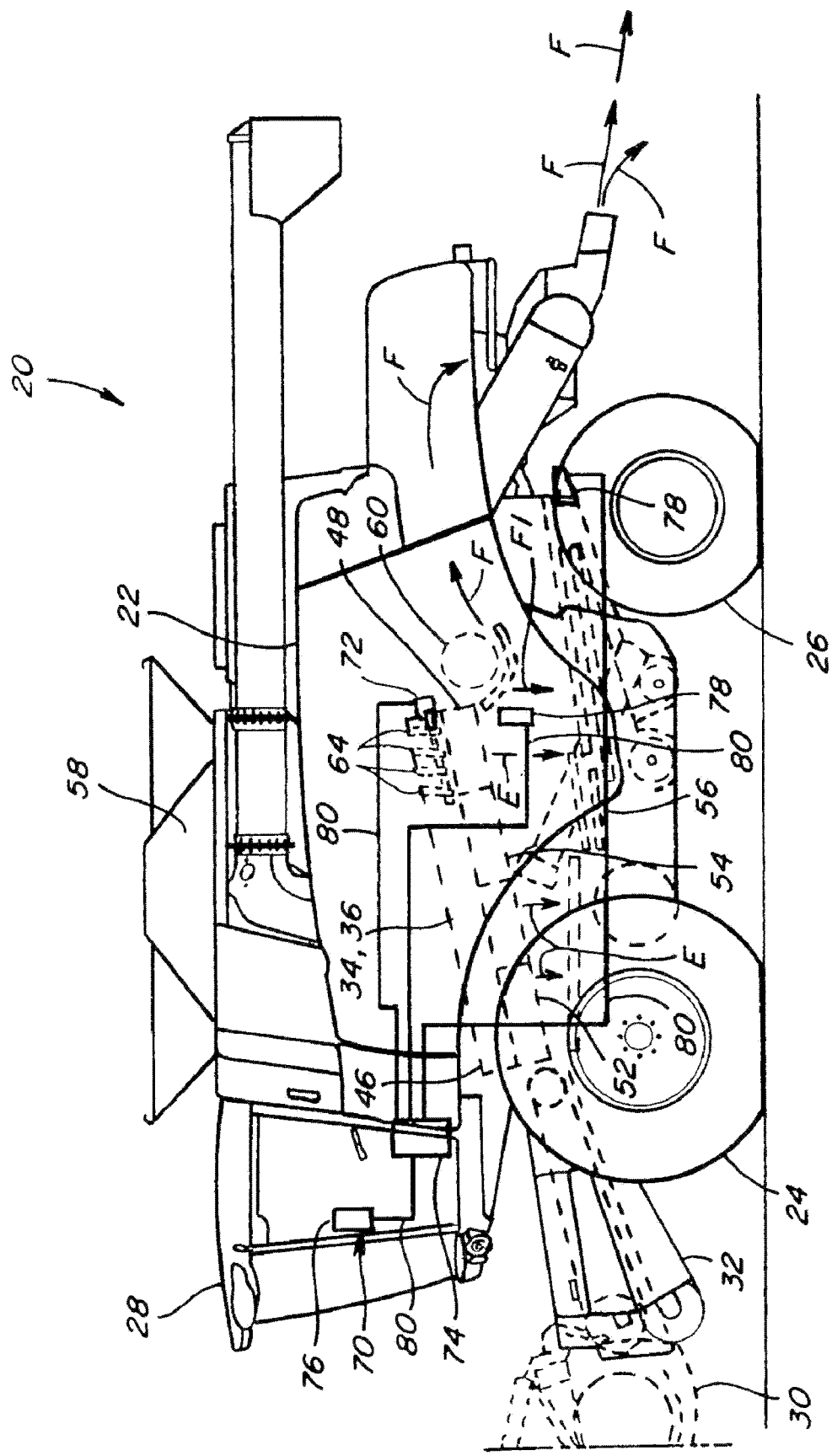
FIG. 1 is a side view of an agricultural combine showing aspects of a system for remotely adjusting threshing cage vanes thereof.

Referring now to the drawings, and more particularly to FIG. 1, there is a representative self-propelled combine 20. Combine 20 includes a body 22 supported on front drive wheels 24 and rear steerable wheels 26. An operator cabin 28 sits atop a front or forward end of body 22, and from which an operator controls operation of combine 20. Combine 20 is provided with a header 30 for cutting the standing crop and conveying the cut crop to a feeder 32. Feeder 32 forms the cut crop material into a generally flat mat and conveys the mat rearwardly into an inlet end of a threshing system 34.

Figure 2:
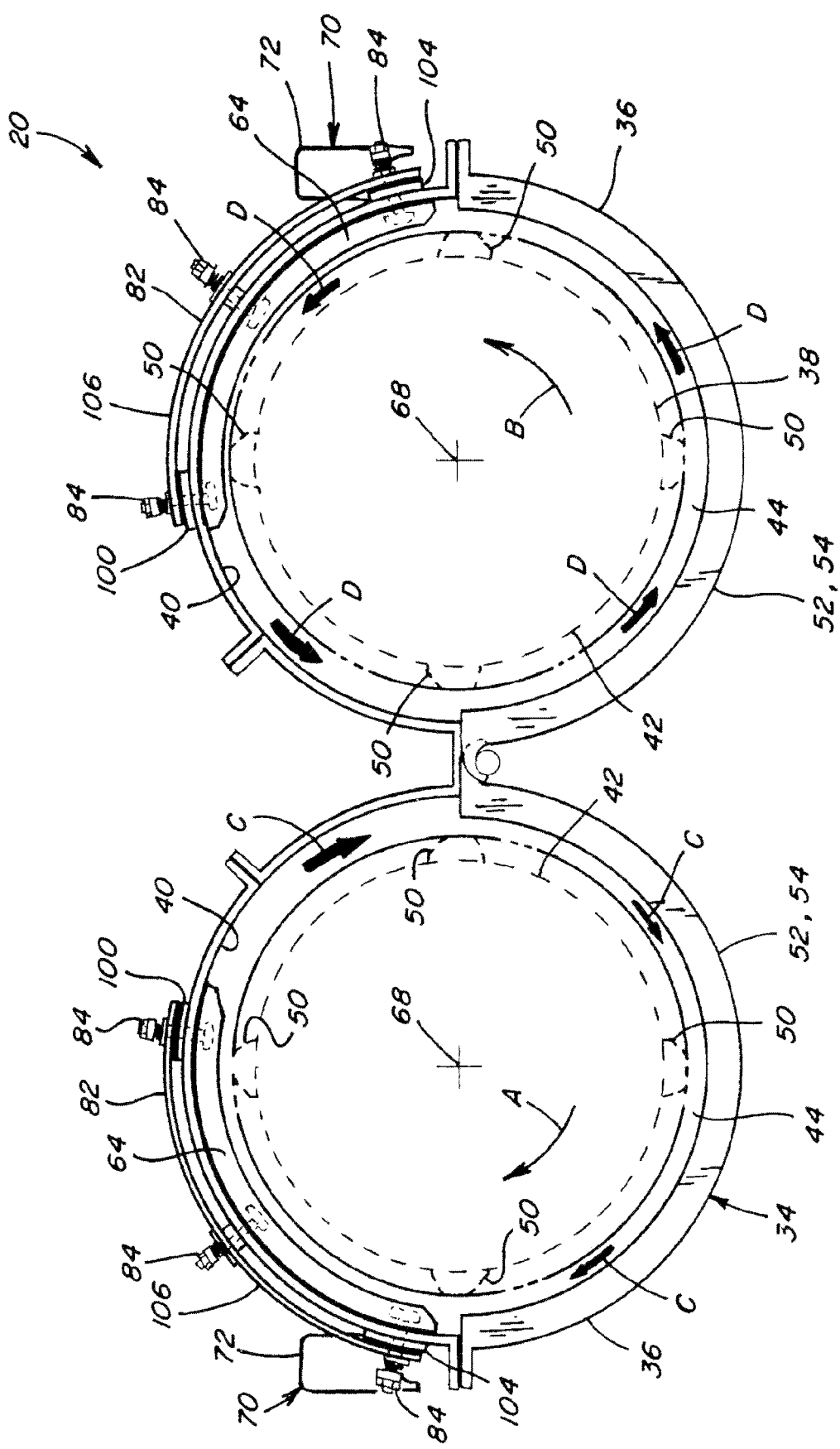
FIG. 2 is an enlarged end view of a threshing system of the combine of FIG. 1.

Now, additionally referring to FIG. 2, threshing system 34 here is depicted as a twin, axial rotor type system, including a pair of side by side, fore and aft extending, generally cylindrical threshing casing or cages 36, each extending about and containing a generally cylindrical rotor 38. Here, it should be noted that the present invention is not limited to twin rotor threshing systems, but has equal utility for a variety of configurations including one or more rotors, and also transversely or otherwise disposed rotors. Each cage 36 has a circumferential inner peripheral surface 40 facing a circumferential outer peripheral surface 42 of the associated rotor 38, in spaced relation thereto, forming and defining a circumferential or annular gap 44 therebetween extending about the rotor. Rotors 38 are rotated in a counter-rotating manner within cages 36, as depicted by arrows A and B, and are configured and operable for inducting the crop mat to flow through gaps 44 as denoted by arrows C and D, in a helical manner from a forward or inlet end 46, to a rear or discharge end 48 of each cage 36.

A plurality of threshing elements 50 are disposed at various locations about outer peripheral surfaces 42 of rotors 38, and cooperate, respectively, with surface features of cage 36, namely, perforated concave sections 52 and grate sections 54, along a bottom region thereof, to thresh the crop material such that most of the grain will be separated from material other than grain (MOG). As a result, the grain and smaller MOG, will be impelled downwardly through the concave and grate sections 52 and 54, while the larger MOG and any remaining grain therein will be expelled from discharge end 48 of the threshing system. Concave sections 52 include several removable arcuate panels extending along about the forward one-half or so of the lower region of cage 36. Likewise, the grate sections 54 consist of several removable arcuate panels extending the remaining half or so of the length of cage 36. The concave sections 52 and grate sections 54 thus generally define respective threshing and separating zones.

The grain and smaller MOG which passes through concave and grate sections 52 and 54 will fall and/or be conveyed to a cleaning system 56 disposed below threshing system 34, as denoted generally by arrows E in FIG. 1. Cleaning system 56 separates the grain from the smaller MOG, and the clean grain will be conveyed to a clean grain tank 58 atop combine 20, and the smaller MOG will be discharged from the combine or reprocessed. Meanwhile, the larger MOG and residual grain discharged from threshing system 34, as denoted by arrows F, will be processed and discharged from the combine by residue processing apparatus, here including a beater apparatus 60 disposed adjacent to discharge end 48 of system 34 and operable for propelling the MOG rearwardly through body 22, and a chopper/spreader 62 configured and operable for optionally chopping and spreading the MOG over a field (arrows F), although a wide variety of other residue processing apparatus configurations could be used.

Figure 3:
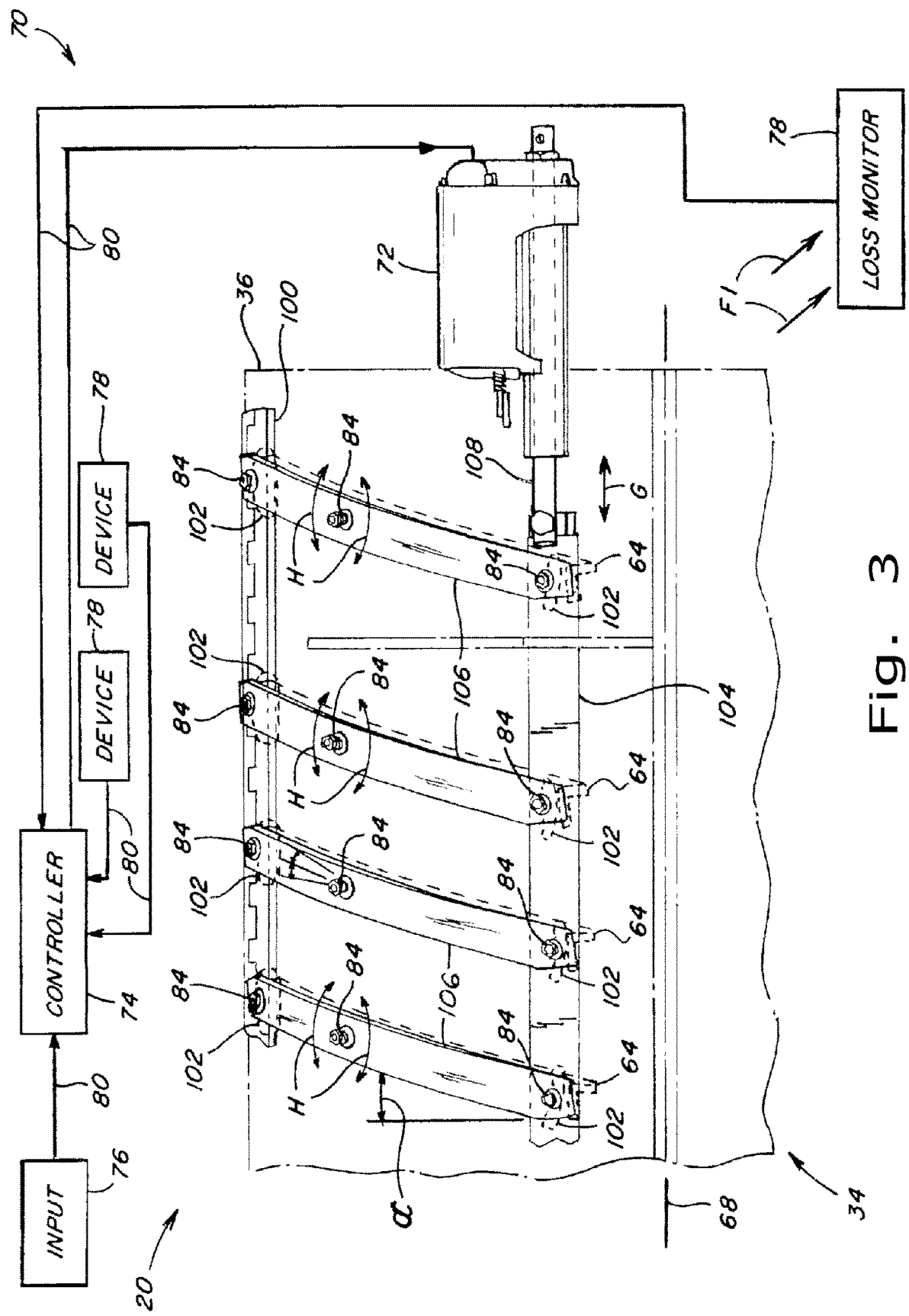
FIG. 3 is a fragmentary side view of the threshing system of FIGS. 1 and 2 along with aspects of the system of the invention.

Now, additionally referring to FIG. 3, threshing system 34 includes a plurality of vanes 64 disposed on an upper region of inner peripheral surface 40 of cage 36. Each vane 64 generally includes an elongate, member, of L-shaped or other suitable cross section, and curved or resiliently curvable into at least substantially conforming relation to the curvature of inner peripheral surface 40, including when positioned at various angles or orientations, while projecting into gap 44. Vanes 64 are each positioned and oriented at a nominal pitch angle $\alpha$(FIG. 3) relative to a line or plane 66 perpendicular to an axis of rotation 68 of the associated rotor 38. Pitch angle $\alpha$ can be the same for all of the vanes, or can vary or be varied one relative to the other, as desired or required for a particular application. An example of a representative pitch angle $\alpha$ for a common threshing system is 21.5 +/−6 degrees, although a wide variety of angles can be used as best suited to a particular threshing system. Vanes 64 can also be evenly spaced apart axially, or at different spacings as desired or required. Thus, the arrangements shown here are for illustration only and are not intended to be limiting, including in regard to the shape and configuration of the individual vanes. It is also contemplated that the pitch angle $\alpha$ may be relative to some reference other than the rotor axis.

Vanes 64 function to guide or direct the flow of crop material, denoted by arrows C and D in FIG. 2, and arrows D in FIG. 3, rearwardly through the respective gaps 44, as propelled by the rotation of the respective rotors 38 and the associated threshing elements 50 thereon. Pitch angle $\alpha$ at which vanes 64 are disposed is typically considered to be a critical parameter with respect to separation and power requirements for operating the threshing system, as explained more fully in U.S. Pat. No. 7,473,170 referenced above, the disclosure of which is incorporated herein by reference in its entirety. Generally, the pitch angle $\alpha$ controls the axial speed at which the crop material travels through the rear region of gap 44 and thus the dwell time of the crop in the separating area, i.e., adjacent grate sections 54. Thus, as a general rule, a smaller pitch angle $\alpha$ will result in a tighter helical path and lower axial speed or rate of movement of the crop material through gap 44, which will typically increase the separation opportunity for the grain to pass through grate sections 54. Conversely, a larger pitch angle $\alpha$ will result in a looser helical path and higher axial speed or rate of movement of the crop material through gap 44, which will typically decrease the possibility of the grain to pass through grate sections 54. A smaller pitch angle will also typically require more power, while a larger angle will consume less.

The concept of varying pitch angle α has been well developed, as evidenced by the above referenced patents, as well as others. However, this has been in the context of providing means of manual adjustment for smaller changes, and even replacement of sets of vanes with set having different fixed pitch angles α, e.g., 20, 30, or 45 degree, as variously advantageous for different crops and applications. It is also well known to provide linkages connecting the vanes to allow joint or simultaneous adjustment. What has not been explored, at least not to the sophistication of the present invention, is the varying of vane position, e.g., pitch angle α, in process, that is, while the threshing system is operating, and doing so in real time response to multiple parameters, e.g. real time grain loss, power consumption, throughput, etc. An advantage of this capability would be the ability to make vane adjustments responsive to an observed operating parameter or parameters, namely, grain loss, or grain flow and grain flow distribution from the threshing system, in real time, to achieve and maintain optimum performance, and respond to changing conditions.

To achieve the above advantages, the present invention is directed to a system 70 and method to enable adjustably controlling the position of the vane or vanes 64, including while threshing system 34 is operating, for improving threshing performance and other operating parameters. Such parameters can include, but are not limited to, grain loss, and in particular, grain not threshed or separated from crop residue and thus which is discharged from the threshing system and the combine with the larger MOG, and that which may end up as tailings that will be processed by the cleaning system and possibly reprocessed by a tailings return system of the combines or discharged, typically depending on settings of the cleaning system and a tailings return system if used. The affected vane position preferably comprises pitch angle α, although the invention is not limited to that positional parameter.

As shown variously in FIGS. 1, 2 and 3, system 70 includes the vane or vanes 64 to be adjusted; an actuator or actuators 72 in connection therewith configured and operable for effecting and holding the adjustments; a controller 74 in operative control of actuator or actuators 72; an input device 76 operable for inputting commands to controller 74; and a device 78 or devices 78 configured and operable for generating or monitoring information representative of an operating parameter or parameters to be sensed or monitored, all connected together by suitable conductive paths 80, which can be, for instance, but are not limited to, wires of a wiring harness, or a controller area network or other suitable wired or wireless communications network.

Each vane 64 is pivotally mounted on cage 36 and resiliently biased in conforming relation to inner peripheral surface 40 thereof, in cooperation with associated aspects of the linkages, which are biased against the outer surface thereof, by a plurality of biased fastener arrangements 84

Each linkage arrangement defines a parallelogram including a first tie bar 100 which extends axially along and is pivotally secured to the exterior of cage 36 by a series of fastener arrangements 84 which extend through apertures through cage 36 which here comprise slots 102. Similarly, a second tie bar 104 is mounted on the exterior of the cage 36 generally parallel to and spaced below first tie bar 100, also by a series of fastener arrangements 84 through additional slots 102. Tie bar 100 is pivotally secured to the upper ends of respective vanes 64, and to the upper ends of accompanying levers 106 extending parallel and in overlaying relation thereto but on the exterior of cage 36, by the fastener arrangements, and tie bar 104 is connected to the bottom ends of the vanes and levers in the same manner. As a result, opposite longitudinal movements of tie bars 100 and 104 will cause corresponding pivotal movements of levers 106, and also vanes 64, all of which are tied together by fastener arrangements 84.

Each actuator 72 of system 70 is mounted externally to respective cage 36, or to suitable adjacent fixed structure. Each actuator 72 here includes an actuator rod 108 connected to the rear lower end of the linkage arrangement. Actuators 72 here are electric linear actuators, operable for extending and retracting rods 108 thereof, as denoted by arrow G, as commanded by controller 74, for effecting opposite longitudinal movements of tie bars 100 and 104 of each linkage arrangement 82, which will cause pivotal movement of levers 106 and vanes 64, as denoted by arrows H, and thus vary pitch angles α accordingly. It is contemplated that actuators 72 may be singular or plural and that the actuators 72 may be pneumatic, electrically driven, hydraulic, mechanical or otherwise driven.

Controller 74 of system 70 is preferably a micro-processor based device controllably operable in a manual or input control mode for controlling actuators 72 responsive to input commands received from input device 76, which can be, for instance, a switch, touch screen or other convenient device located in operator cabin 28 or at another desired location, and operable by an operator for inputting desired commands or settings to system 70. Controller 74 is also preferably configured and programmed to have a selectable automatic mode wherein it will automatically respond to inputs received from a grain loss monitor 78, configured and operable for monitoring grain loss or flow from threshing system 34, as denoted by arrow F1 in FIG. 3. The present invention can be placed in different modes that provide differing priorities to controller 74 for the control of vanes 64. For example, a functional mode for the minimization of grain losses keeping them below a maximum acceptable level, a power efficiency mode to prioritize power efficiency, and a maximum throughput mode to prioritize the throughput of the system, to name a few.

Grain loss or flow from system 34 can be monitored in various ways, including by positioning a monitor or monitors 78 for monitoring grain flow through grate sections 54, or through perforations of an underlying pan of beater apparatus 60, as denoted by arrow F1 in FIGS. 1 and 3. In both instances, the grain flow actually measured will still be directed to cleaning system 56, but if it is observed to increase or decrease as a result of varying vane position, this will be indicative that there is recoverable grain lost with flow F from the combine and this data can be used for developing quantitative data and process optimization. Similarly, a device 78 employed for sensing flow through a tailings recovery system of the combine and any changes in tailings flow associated with varying vane position can be used for optimizing the process. Still further, data from a grain loss monitor 78 (FIG. 1) associated with losses from cleaning system 56 that changes with vane settings can be utilized for optimization of those and other settings.

Figure 4:
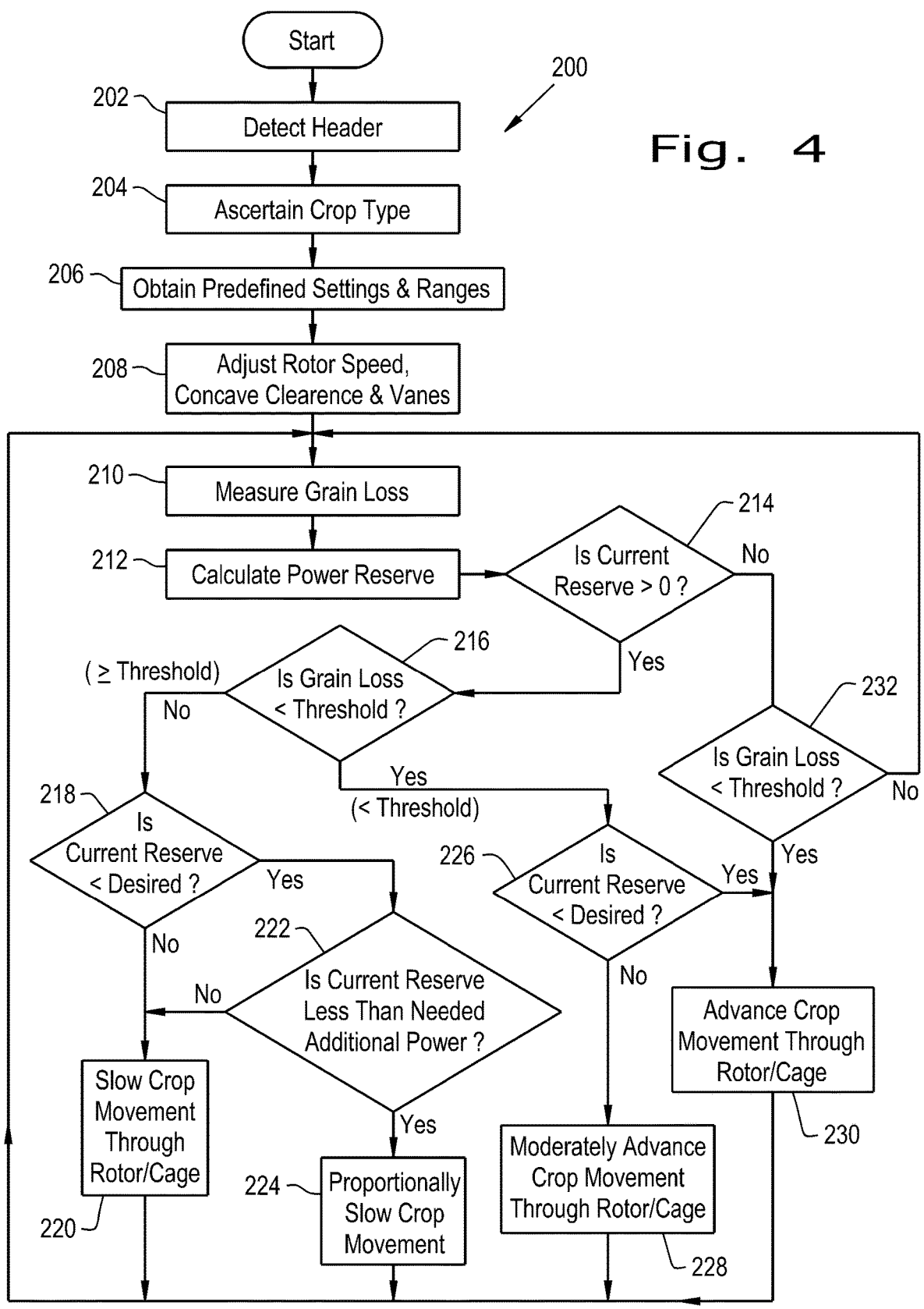
FIG. 4 is a flowchart illustrating an embodiment of a method of the present to control the threshing system shown in FIGS. 1-3.

Other embodiments of devices 78 that are contemplated for use with system 70 include an engine load sensor, which is used by the method detailed in FIG. 4. Any or all of the data from devices 78 as well as input commands from input device 76, can be used, e.g., in a decision map or matrix, for determining a most advantageous or optimized vane setting for a particular application, on a real time, continuing, or intermittent or periodic basis. While broadly, it may be desired to manage power consumption as a function of grain loss, or visa versa, the present invention endeavors to balance the management of both the power consumption of the engine and the grain loss of the threshing section.

The advancing of the vane angles results in lower fuel consumption, lower cleaning system chaff, higher unthreshed losses, increased straw length, and higher ground speed due to power savings. The slowing of the crop movement by retarding the vane angle results in opposite outcomes. It is contemplated that these outcomes can serve as criteria similar to the grain loss criteria discussed herein. The use of these criteria can be considered in combination with the grain loss and/or with each other as well in carrying out the practice of the present invention. The vanes 64 can be put in a slower position when unthreshed losses are coming too high as detected by an unthreshed loss sensor.

Now, additionally referring to FIG. 4 there is illustrated a method 200 in the form of a flowchart. At step 202, controller 74 detects the type of header 30 that is installed on combine 20. This information along with data obtained from the operator at step 204 identifies the type of crop that is to be harvested by harvester 20. Based on the type of crop then predefined settings and ranges of setting adjustments are obtained by controller 74, for example from a memory location, not shown. The preliminary predefined settings are then used to set such things as the rotational speed of rotor 38, the clearance of concaves 52 and the angular position of vanes 64. The ranges are then the limitations of the allowed adjustments that can be made by method 200 or by an operator, as in method 300.

At step 210 a grain loss value is obtained from loss monitor 78 and it is evaluated. The engine power reserve is computed at step 212 to determine the current reserve value. The reserve can be considered as the difference between the maximum power production of the engine and the current power production. So if the engine is operating at 80% of its maximum power there is then a 20% reserve. The desired reserve is obtained at step 206 by controller 74 and is used by method 200 for making operational decisions. For purposes of discussion it will be assumed that the desired reserve is 20%, although the number can be any number, and 20% was selected just for the purposes of discussion.

When the current power reserve is calculated and if the power reserve is greater than zero as seen in step 214, then method 200 proceeds to step 216, otherwise method 200 proceeds to step 232. At step 216, the grain loss, measured at step 210, is compared to a threshold grain loss value and if the measured grain loss is less than the threshold method 200 proceeds to step 226. If the measured grain loss is not less than the threshold then method 200 proceeds to step 218.

At step 218, the current engine reserve is compared to the desired 20% reserve and if the current reserve is greater or equal to the desired reserve then step 220 is executed and the crop movement through the rotor/cage assembly is slowed by moving vanes 64 to a smaller angle α within the range of alphas obtained at step 206 and which can be proportioned relative to the amount of departure of the grain loss from the threshold and the amount of remaining power reserve. The movement of vanes 64 to a smaller angle changes the helical movement of the crop material so that the path is longer hence slowing the movement of the crop material through the rotor/cage assembly.

If the current reserve is less than desired then method 200 proceeds from step 218 to step 222, where a further refining comparison is made. If the current reserve is less than the additional power needed to lower the grain loss to below the threshold is more than the current reserve, then only a moderated proportional movement of vanes 64 is made, at step 224 so that the power consumption does not completely exhaust the power reserve. For example, if the current reserve is 8% and the amount of additional power needed to meet the desired decrease in grain loss is 12%, then the reduction in the alpha angle is not reduced as much as is needed so that the engine is not overly burdened. Another way of stating this is, for example, if the estimated alpha angle adjustment to reduce the grain loss to the desired threshold is 6 degrees and that the estimated additional power required if the alpha angle is adjusted by 6 degrees is 12 KW and the available reserve power is only 6 K, then the alpha angle is proportionally adjusted by 3 degrees, in the carrying out of step 224. However, if the current reserve is greater than the estimated need power then method 200 proceeds to step 220.

Back at step 216, if the grain loss is less than the threshold that allows method 200 to reduce the power consumption of the engine by advancing the flow of the crop material through the rotor/cage. This is decided by looking at the current reserve and if it is less than the desired amount then method 200 proceeds to step 230 where the crop movement is advance by movement of vanes 64 to a larger angle α. If the current reserve is greater or equal to the desired reserve then a moderate advancement of the crop movement is made at step 228 to a lesser angle than that taken on at step 230.

Back at step 214, if the current reserve is not greater than zero, then method 200 proceeds to step 232 where, similar to step 216, the grain loss is compared to the threshold and if the grain loss is less than the threshold, method 200 proceeds to step 230, where the crop movement is advanced thorough the rotor/cage. If the grain loss is not less than the threshold then method 200 returns to step 210. This section of the procedure accommodates a recovering a positive power reserve.

Figure 5:
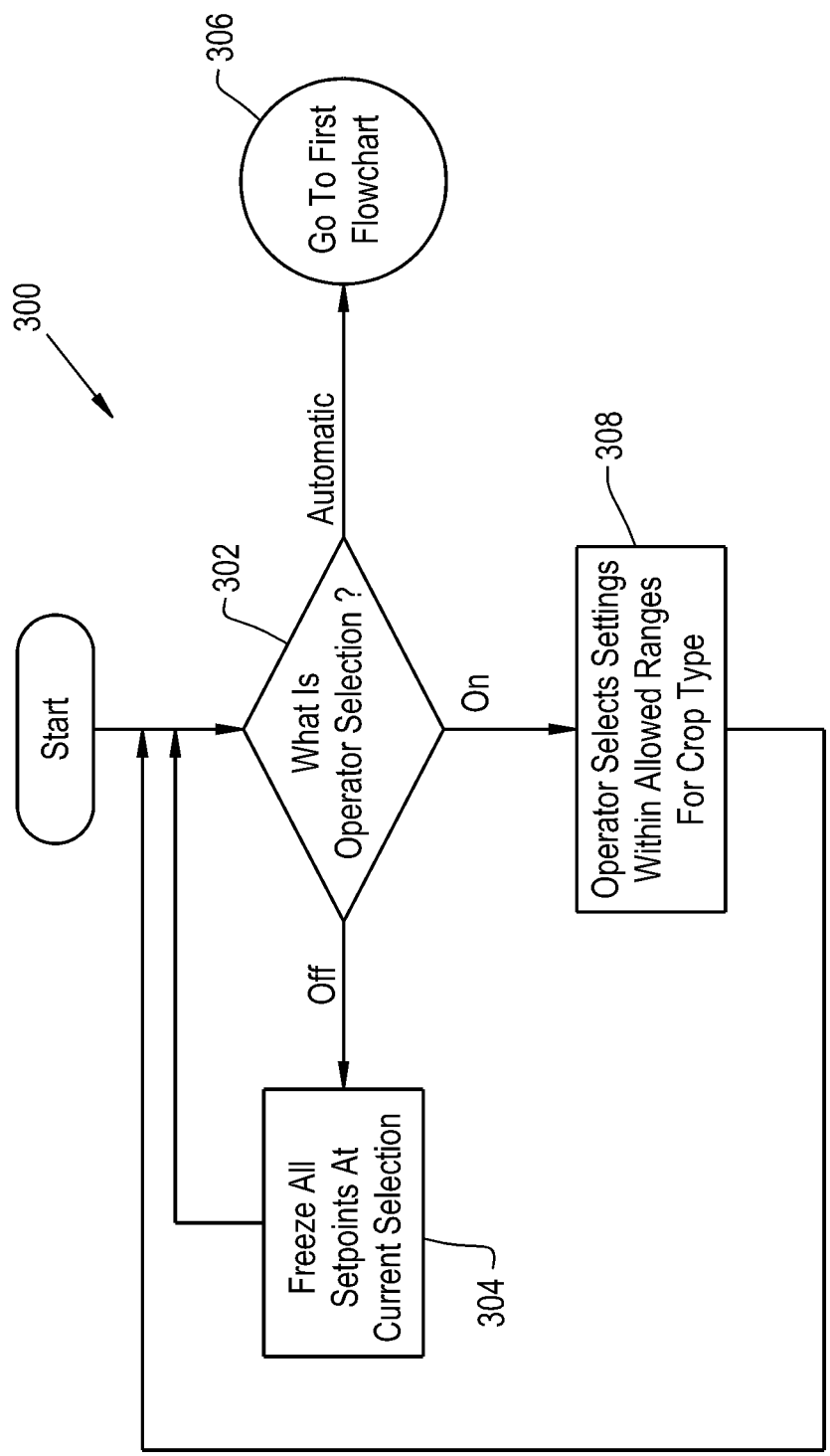
FIG. 5 is a flowchart that illustrates another embodiment of a method to control the threshing system shown in FIGS. 1-3 when the combine is proximate to the headlands.

Now, additionally referring to FIG. 5 there is shown a method 300 in the form of a flowchart that illustrates operator intervention in whether method 200 is selected. At step 302 the operator makes a selection that allows operator selection of settings within allowed ranges for the particular crop type (step 308), that all settings are frozen at their current values (step 304) or that the automated procedure of method 200 is followed at step 306. If the operator varies the selection and arrives at step 306 the entry point for method 200 may be at step 210.

Figure 6:
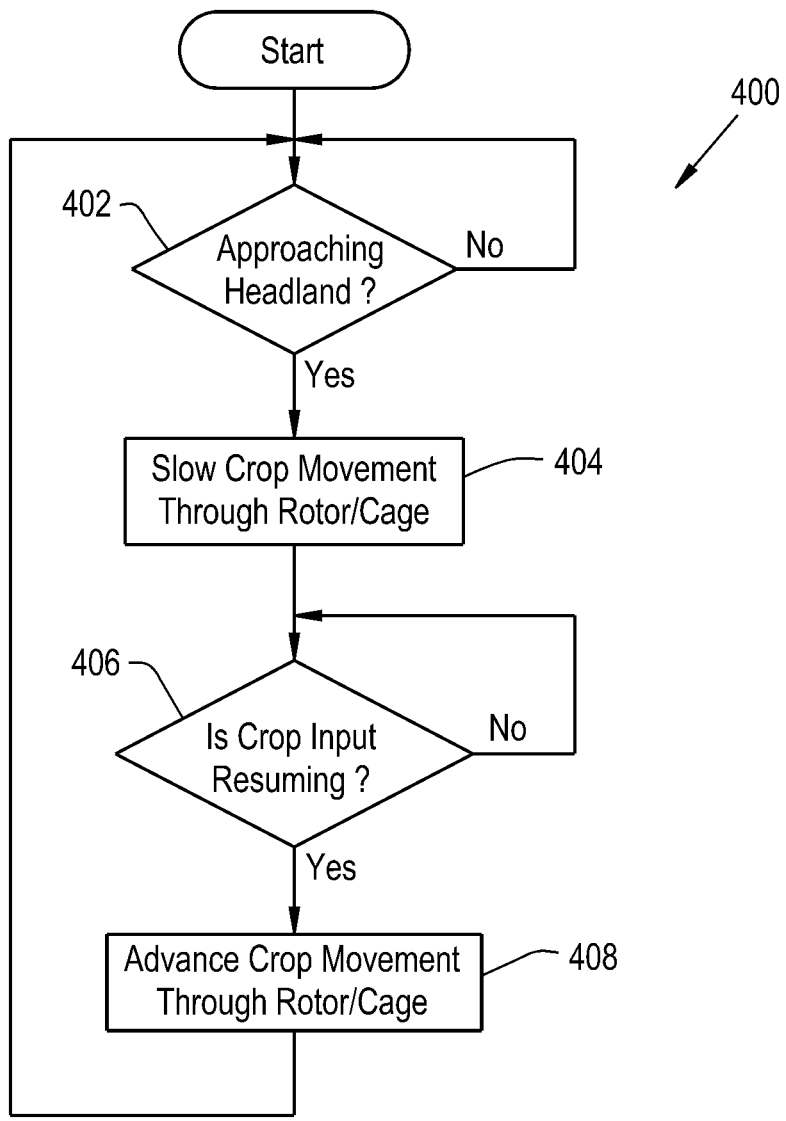
FIG. 6 is a flowchart illustrating some controls that the present invention provides for the operator of the threshing system of FIGS. 1-3 to operate.

Now, additionally referring to FIG. 6 there is shown a method 400 in the form of a flowchart that address the vane settings (slowing and advancing crop movement) relative to an encounter with a headland area in the harvesting process. As combine 20 approaches the edge of a field, the area in which the crop has been harvested at the ends of the field, so that turns can be made in a manner without running over crops, known as a headland is approached. When a headland is encountered the crops have been harvested and since the influx of crop material has stopped the threshing system will have a tendency to empty itself and the attendant airflows will have a tendency to blow out the crop material. Here the present invention anticipates this and slows down the crop movement through the threshing system. More specifically, at step 402 the approaching headlands is detected, which can take place in a predictive manner with a GPS system, a vision system or some other system that can detect the approach to a headland. At step 404 the crop movement through the rotor/cage is slowed by adjusting the vane 64 angle α to a small angle. Then when it is detected that crop material is again being routed to the threshing section by step 406, then the crop movement is advanced through the rotor/cage assembly at step 408 by adjusting the angle α back to its previous setting. It is also contemplated that when the travel speed is reduced by the operator (for reasons such as an obstruction, header/feeder crop transition hesitation, or other reason). In these conditions, the vanes can also be slowed down in order to reduce rotor losses.

The present invention is directed to an automated method of adjusting the angular displacement of the guide vanes 64 in combination with a control system that varies and limits the range of motion based upon a single or series of inputs such as: Header Type. Crop Type and properties as part of an ACS setting, Rotor Speed, Threshing load, Machine size or class (vehicle power). The angular position of the vanes 64 in a rotor cage 36 can be manipulated to control the speed in which crop is moved axially about a rotor. The angular range of adjustment required to obtain optimal threshing performance can vary from crop to crop. A predefined limit to the angular range of adjustment of the rotor cage vanes 64 is set via a single or combination of inputs including: the header type, the crop type as part of an ACS setting, rotor speed and threshing load.

The angular adjustment of the rotor cage vanes 64 changes the performance characteristics of the threshing system. Decreasing the angle of the cage vanes 64 typically results in a reduction of loss at the expense of increased power consumption by the rotor. In some crops, if the cage vane angle is overly reduced or slowed, a stagnation of material can occur which will hinder grain separation, and potentially plug the vehicle. Increased levels of wear may also be seen with such a setting. On the other hand, if the vane angle is adjusted to an excessive angle, loss from the rotor can become unacceptable with an attending reduction in the profitability of the unit. The optimal range for the angular displacement of the rotor cage guide vanes 64 varies from crop to crop.

The rotor guide vane 64 position is controlled and limited to a predefined position or range of positions based upon the header type, the crop type and properties as part of an ACS setting, rotor speed, threshing load and available engine power. For example, when an operator choses to harvest corn, with a corn header, the rotor cage vane position could be preset to a position of, for example, 15 degrees, with a limit of travel from 10-20 degrees. Positions greater than 20 degree could result in excessive loss. When the operator changes headers, and starts to harvest soybeans, the preset position is automatically set to a position of 20 degree with a limit of 15-25 degrees. Positions less than 15 degrees could result in material stagnation, reduced throughput capacity and excessive wear. As such the system allows for greater optimization of the vehicle without introducing the potential for maladjustment of the system. For example, the threshing rotor needs a certain amount of charge load to maintain an optimal grain on grain threshing in order to control rotor loss at low throughputs. As such, the vanes can be set to a very slow crop movement position for areas of the field where the crop is light (which can be predicted positionally as a result of recorded data from a previous adjacent swath) or while entering and exiting crop as part of a headland routine (see method 400), and then adjust to a more normal and advanced position once a certain power is measured on the rotor.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling crop material speed through a rotor/cage assembly of an agricultural combine, comprising the steps of:
   monitoring at least one of a grain loss of the combine, a cleaning system load, and a straw length; and
   adjusting an orientation of a vane coupled to the cage, thereby adjusting the crop material speed through the rotor/cage assembly, responsive to at least one of the grain loss, the cleaning system load, and the straw length;
   wherein slowing movement of crop material through the rotor/cage assembly is dependent upon a grain loss value determined by the monitoring step that is greater than a predetermined loss value.

2. The method of claim 1, comprising a further step of initially adjusting the orientation of the vane responsive to a predefined setting.

3. The method of claim 1, comprising a step of providing an actuator connected to the vane and controllably operating the actuator for moving the vane, the adjusting step orienting the vane dependent on the grain loss.

4. The method of claim 3, wherein the vane is oriented at a pitch angle relative to an axis of the rotor.

5. The method of claim 4, wherein the pitch angle is selected within a predefined range of values dependent upon a type of crop being harvested.

6. The method of claim 1, further comprising a step of setting a predefined limit to an angular range of adjustment of the vane via at least one of a header type, a type of crop being harvested, a rotor speed, and a threshing load.

7. A method for controlling crop material speed through a rotor/cage assembly of an agricultural combine, comprising the steps of:
   monitoring at least one of a grain loss of the combine, a cleaning system load, and a straw length; and
   adjusting an orientation of a vane coupled to the cage, thereby adjusting the crop material speed through the rotor/cage assembly, responsive to at least one of the grain loss, the cleaning system load, and the straw length;
   wherein advancing the movement of crop material through the rotor/cage assembly is dependent upon a grain loss value determined by the monitoring step that is less than a predetermined loss value.

8. An agricultural combine, comprising:
   a chassis;
   at least one cage carried by the chassis;
   a rotor configured to rotate about an axis within the cage, the rotor and cage being a rotor/cage assembly;
   a plurality of vanes movably coupled to an inside surface of the cage; and
   a controller configured to control crop material speed through the rotor/cage assembly by carrying out the steps of:
      monitoring at least one of a grain loss of the combine, a cleaning system load, and a straw length; and
      adjusting an orientation of at least one vane of the plurality of vanes, thereby adjusting the crop material speed through the rotor/cage assembly, responsive to at least one of the grain loss, the cleaning system load, and the straw length wherein the controller is configured to adjust an orientation of the at least one vane to adjust the crop material speed through the rotor/cage assembly dependent upon a grain loss value determined by the monitoring step that is greater than a predetermined loss value.

9. The agricultural combine of claim 8, wherein the controller is further configured for setting a predefined limit to an angular range of adjustment of the at least one vane via at least one of a header type, a type of crop being harvested, a rotor speed, and a threshing load.

10. The agricultural combine of claim 8, wherein the controller is further configured to initially adjust the orientation of the vanes responsive to a predefined setting dependent upon a crop type.

11. The agricultural combine of claim 8, further comprising an actuator coupled to the vanes and under control of the controller for moving the vanes, the adjusting step orienting the at least one vane dependent on the grain loss.

12. The agricultural combine of claim 11, wherein the vanes are oriented at a pitch angle relative to an axis of the rotor.

13. The agricultural combine of claim 12, wherein the pitch angle is selected within a predefined range of values dependent upon the type of crop being harvested.

14. An agricultural combine, comprising:
a chassis;
at least one cage carried by the chassis;
a rotor configured to rotate about an axis within the cage, the rotor and cage being a rotor/cage assembly;
a plurality of vanes movably coupled to an inside surface of the cage; and
a controller configured to control crop material speed through the rotor/cage assembly by carrying out the steps of:
  monitoring at least one of a grain loss of the combine, a cleaning system load, and a straw length; and
  adjusting an orientation of at least one vane of the plurality of vanes, thereby adjusting the crop material speed through the rotor/cage assembly, responsive to at least one of the grain loss, the cleaning system load, and the straw length;
wherein the controller is further configured to adjust the orientation of the at least one vane to adjust the crop material speed through the rotor/cage assembly dependent upon a grain loss value determined by the monitoring step that is less than a predetermined loss value.

* * * * *